Patented Dec. 9, 1947

2,432,333

UNITED STATES PATENT OFFICE 2,432,333

PROCESS OF INCREASING THE ROSIN-TO-FATTY ACID RATIO IN MIXTURES OF ROSIN AND FATTY ACIDS

Robert C. Palmer and Anthony F. Oliver, Pensacola, Fla., assignors to Newport Industries, Inc., Pensacola, Fla., a corporation of Delaware No Drawing. Application November 30, 1946, Serial No. 713,384

17 Claims. (Cl. 260—97.5)

This invention relates to a process of increasing the rosin-to-fatty acid ratio in mixtures of rosin and fatty acids, such as are present in crude and refined tall oil. More particularly, the invention relates to a process of preparing a product of increased rosin-to-fatty acid ratio, up to and including a rosin product containing substantially no fatty acids, by subjecting a starting mixture of rosin acids and fatty acids, such as tall oil, to the adsorbent action of an adsorbent medium of the hydrated silicate type that exhibits selective or preferential adsorbent activity toward fatty acids in comparison with rosin acids.

In U. S. Patent No. 2,280,842, dated April 28, 1942, issued to us, there is described a method of isolating fatty acids from tall oil, as a preliminary step of which tall oil is purified by filtering an 18% naphtha solution of the tall oil through a bed of fuller's earth in a ratio of earth to tall oil solids of 2 to 1 by weight. The patent gives figures for the rosin acids content in the crude and refined tall oil of 38.8% and 37.5%, respectively, thus showing no increase in the rosin acids content as a result of the filtration through fuller's earth. At the time of filing that patent, we had no concept of the selective adsorbent activity of fuller's earth toward fatty acids as compared with rosin acids, nor do the results obtained in the example given in the patent just referred to indicate the existence of such selective adsorbent activity.

Numerous other references can be found in the patent literature to the use of adsorbent decolorizing materials for the purpose of refining tall oil, but all of these references show similar results as regards the relative rosin acids content of the crude and refined materials.

We have now found, however, that under proper conditions the rosin acids content of a mixture of rosin acids and higher fatty acids, such as the mixtures that are to be found in crude and refined tall oil, may be greatly increased over the proportion of rosin acids-to-fatty acids present in the starting material. Depending upon the condition employed, the rosin acids-to-fatty acids ratio may be increased to a point at which the rosin acids, substantially free from fatty acids, may be obtained as the final product. In fact, if desired, the process of our invention may be used for the separation of rosin acids from mixtures of rosin acids and fatty acids to produce a pale, hard, rosin substantially free from fatty acids and having a melting point of 50° C. (capillary method), or higher. For some purposes, however, it is sufficient merely to increase the rosin acids-to-fatty acids ratio as compared with the original starting material, and our process is admirably adapted for that.

In general, the principles involved in the process of our invention may be better understood from the following description of what occurs during the filtration of a solution of the starting mixture of rosin and fatty acids in an aliphatic hydrocarbon solvent through a body or bed of an adsorbent medium. When such a solution of the starting mixture of rosin and fatty acids is brought into contact with a body of the adsorbent medium, as by percolation through a bed of such medium, the adsorbent medium first adsorbs all of the solids in the solution up to its absorptive capacity. Thus, in percolating a solution of the mixture of rosin and fatty acids through the bed of the adsorbent medium, the filtrate first coming through is the solvent itself, free of any solids. As more solution of the mixture is passed through the bed, the rosin acids are displaced from the adsorbent medium by the fatty acids present in the incoming solution. This may occur because the fatty acids are somewhat stronger acids than the rosin acids, or because the fatty acids are more strongly polar, but whatever the reason, the phenomenon takes place.

As the filtration continues, both rosin acids and fatty acids, previously adsorbed by the adsorbent medium, are displaced from the adsorbent medium by color bodies, oxygenated material, and the like, which are more polar in nature than either the rosin acids or the fatty acids. The result is that the filtrate, as the filtration through a given body of adsorbent medium progresses, from being first free of solids and then containing principally rosin acids, becomes richer and richer in fatty acids until finally the proportions of rosin acids to fatty acids in the filtrate reach substantially the same proportions as in the starting material.

If, however, in accordance with our present invention, the filtrate is analyzed from time to time and filtration through the adsorbent medium is stopped while the filtrate as a whole has the desired higher proportion of rosin acids to fatty acids than in the starting material, a product can be obtained by separating the solvent from the filtrate that will contain such higher proportion of rosin to fatty acids. Thus, depending upon the analysis of the filtrate and/or where the filtration is stopped, a product can be obtained from the filtrate that will vary all the way from only a slightly higher ratio of rosin acids to fatty acids than was present in the starting material to a product containing substantially rosin acids, only. After the filtration through the adsorbent medium is stopped, the solution remaining admixed with the adsorbent may be displaced by an aliphatic hydrocarbon solvent alone, that is, a solvent containing no rosin or fatty acids, and the resulting filtrate combined with the previously obtained filtrate, or collected separately.

The pre-refinement of the tall oil may be accomplished by any suitable method, such as by the employment of adsorbent materials or by the use of selective solvents, as for instance furfural, that are useful in the refining of crude rosins, by the catalytic pre-treatment of the tall oil, by vacuum distillation, by heat treatment of the tall oil with or without chemicals that isomerize the rosin acids, or by chemical treatment which not only purifies but polymerizes the rosin and/or fatty acids.

Various methods have heretofore been suggested for effecting the separation of rosin acids from admixtures of rosin acids and fatty acids, as in tall oil, such as by fractional distillation or fractional crystallization, but such methods have never resulted in the complete separation of the rosin acids from the fatty acids where distillation was used, or in the complete separation of fatty acids from rosin acids where crystallization was the means employed, unless extreme and decidedly uneconomical methods, such as repeated crystallization, were used.

The ratio of rosin acids to fatty acids in the starting mixture governs to a considerable extent the efficiency of the separation; the higher the rosin acids content in the starting mixture, the greater the efficiency of the process with respect to the recovery of the rosin, if rosin substantially free from fatty acids is the desired end point.

Our discovery is all the more remarkable in that the selective separation observed is, in fact, contrary to the result obtained where an amount of the adsorbent material only sufficient to obtain a commercially practicable degree of decolorization is employed. As pointed out above, where two parts of decolorizing clay to one part of crude tall oil in naphtha solution was used for refining the tall oil in a percolation system, we observed that the rosin acids content of the refined oil was slightly less than that of the crude tall oil. One would hardly expect, therefore, that if the ratio of adsorbent medium to crude tall oil were increased to some figure greater than two to one, a ratio would be found such that the material recovered from the filtrate would show a great increase in rosin acids content, yet such was found to be the case.

Even less would one expect that conditions could be found that would permit the use of a ratio of adsorbent medium to crude tall oil solids of less than two to one. We found, however, that by the proper conditioning of the adsorbent medium, as by a control of its moisture content, and also by the selection of a solvent medium the solvency value of which is favorable to our separation process, a ratio of adsorbent medium to tall oil solids as low as one to one will produce an enrichment of rosin acids in the filtered product as compared with starting material. The ratio of adsorbent medium to the solids content of the starting mixture of rosin and fatty acids is, therefore, not the sole criterion determining the effectiveness of our process in increasing the rosin acid content of the starting mixture.

It is therefore an important object of this invention to provide a process of so-treating a starting mixture of rosin and fatty acids with an adsorbent medium of the hydrated silicate type as to increase the proportion of rosin acids to fatty acids as compared with the starting material, even to the extent of obtaining a product consisting largely of rosin acids and substantially free of fatty acids.

It is a further important object of this invention to provide a process for separating rosin acids from admixtures of rosin acids and fatty acids, such as are present in crude or treated tall oil, by utilizing the selective adsorbent action of an adsorbent decolorizing medium of the hydrated silicate type toward the fatty acids contained in the starting mixture.

It is a further important object of this invention to provide a process of increasing the rosin-to-fatty acids ratio in mixtures of rosin and fatty acids by subjecting solutions of the starting mixture in an aliphatic hydrocarbon solvent to the action of an adsorbent medium of the hydrated silicate type, controlling the conditioning of the adsorbent medium and the ratio of adsorbent medium to solids content in the starting mixture, and selecting a solvent of suitable solvency value, so as to effect such increase most efficiently.

It is a further important object of this invention to provide a process that is relatively simple and economical for the complete, or substantially complete, separation of fatty acids from rosin acids contained in a starting mixture of both acids in impure form, as for instance in tall oil.

It is a further important object of this invention to provide a process for the recovery of rosin acids, and of fatty acids, in substantially pure form from crude or refined starting mixtures of rosin acids and fatty acids, such as are present in crude or refined tall oil the process including a series of simple physical steps of concentrating the rosin acids to provide a mixture comprising predominantly rosin acids and a minor proportion of fatty acids, subjecting such mixture to the action of an adsorbent medium to selectively adsorb the fatty acids, revivifying the spent adsorbent to release therefrom the fatty acids together with any remaining rosin acids, and after another purifying, if desired, recycling the material by fractionally distilling fatty acids, concentrating the rosin acids and subjecting the concentrated rosin acids to fractional adsorption to separate rosin acids in substantially pure form.

Other and further important objects of this invention will be apparent from the disclosures in the specification and appended claims.

As the starting material, any commercially available mixture of rosin and fatty acids may be employed, but the invention will be described more particularly as applied to a tall oil as the starting material. Either a crude tall oil, a refined tall oil substantially free from color bodies and heat unstable ingredients, oxygenation products and the like, a partially or completely hydrogenated tall oil or a partially polymerized tall oil, may be employed. Where a pre-refined tall oil is to be used, the pre-refinement may be accomplished by any suitable method, as by the employment of adsorbent materials or by the use of selective solvents such as those used in the refining of crude rosin, among the principal ones of which may be mentioned furfural. Pre-refinement of the tall oil may also be accomplished by catalytic treatment or by vacuum distillation, or by heat treatment with or without chemicals that serve to isomerize the rosin acids, or by refinement by chemical treatment that not only purifies but also polymerizes the rosin and/or fatty acids.

The starting mixture of rosin and fatty acids, in accordance with our process, is dissolved in a solvent for which the adsorbent material has little or no affinity, as compared with its affinity for rosin and fatty acids, coloring bodies, heat unstable bodies, and other ingredients of the tall oil. The solvent used, of course, cannot be one that could be used to revivify the adsorbent medium for re-use, since the revivifying solvent must be one that is more strongly adsorbed by the adsorbent medium than is the already adsorbed material that must be displaced from the adsorbent medium in order to revivify the adsorbent medium.

later on. The tall oil used was a tall oil that had been refined by previous filtration through fuller's earth in a ratio of 0.8 to 1 earth-to-solids content, the earth containing 3.5% of residual water. This preliminary filtration to remove coloring bodies did not change the ratio of rosin acids to fatty acids from that obtaining in the original tall oil, but did change the color from D to N on the standard rosin color scale. The table follows:

| Solvent | Kauri Value | Composition Filter Base | | Ratio Earth Used For Selective Filtration | Composition Filtered Products | |
|---|---|---|---|---|---|---|
| | | R. A. | F. A. | | R. A. | F. A. |
| 2,2,4-Trimethyl Pentane | 22.4 | 69.6 | 23.7 | 3/1 | 88.5 | 6.8 |
| Gasoline #1 | 23.6 | 69.6 | 23.7 | 3/1 | 87.3 | 8.8 |
| N. Hexane | 24.1 | 69.6 | 23.7 | 3/1 | 85.6 | 10.6 |
| Comml. Naphtha | 31.6 | 69.6 | 23.7 | 3/1 | 83.0 | 12.6 |
| Isoheptane | 34.4 | 69.6 | 23.7 | 3/1 | 82.0 | 13.3 |
| 2,2,4-Trimethyl Pentane | 22.4 | 69.6 | 23.7 | 2/1 | 81.4 | 13.8 |
| Comml. Naphtha | 31.6 | 69.6 | 23.7 | 2/1 | 77.3 | 19.4 |

Using refined tall oil still residue:

| | | | | | | |
|---|---|---|---|---|---|---|
| Gasoline | 23.6 | 79.5 | 9.3 | 1/1 | 83.5 | 5.5 |
| Comml. Naphtha | 31.6 | 79.5 | 9.3 | 1/1 | 83.0 | 6.5 |

In general, cheap readily available petroleum solvents are preferred for economic reasons. Any of the so-called petroleum naphthas constitute satisfactory solvents. The aliphatic hydrocarbon solvents found most effective for our purposes are those having relatively low Kauri Butanol values.

The Kauri Butanol value is determined in accordance with the procedure described on pages 449 and 450 of "Physical and Chemical Examination of Paints, Varnishes, Lacquers and Colors," by Gardner-Sward, Tenth ed., 1946. The numerical Kauri values specified hereinafter are values determined in accordance with that procedure and converted to a numerical standard, based upon a Kauri value of benzene equal to 100. On this basis, the following aliphatic hydrocarbon solvents have the Kauri values indicated:

| | |
|---|---|
| 2,2,4-trimethyl pentane | 22.4 |
| Gasoline #1 | 23.6 |
| N-hexane | 24.1 |
| Commercial naphtha | 31.6 |
| Iso-heptane | 34.4 |

The gasoline referred to in the above list as Gasoline #1 is a product produced by Phillips Petroleum Company that is said to be completely devoid of ring and olefinic structures and to consist almost entirely of paraffinic type molecules, the gasoline having a boiling range of 200 to 250° F.

All of the above listed solvents belong to the general class of aliphatic hydrocarbons. The lower the Kauri value of the aliphatic hydrocarbon, the more effective such hydrocarbon is in the process of our invention. In other words, if other conditions are the same, an aliphatic hydrocarbon having a lower Kauri value will bring about a greater increase in the ratio of rosin acids to fatty acids when the process of our invention is used. This is illustrated in the table below, in which the effect of the solvency of the solvent upon the selective action of earth towards fatty acids is shown.

In gathering the data shown in the following table, the adsorbent medium used was a fuller's earth of 16 to 30 mesh, known commercially as "B" Floridin, having a moisture content of 0%, as determined by procedures described herein The foregoing table shows that with a solvent of relatively low solvency value, such as Gasoline #1, a very significant increase in the ratio of rosin acids to fatty acids can be obtained even with as low a ratio of earth-to-solids as one to one, whereas with a solvent of higher solvency value, such as commercial petroleum naphtha, there is appreciably less selective action of such solvent at the low earth-to-solids ratio of one to one. The usefulness of any untried solvent for the purpose of our invention can thus be predicted from a determination of its numerical Kauri value. In general, all normally liquid aliphatic hydrocarbons are effective, and even those containing some aromatic compounds, or other cyclic compounds, can be used, but not so effectively.

The adsorbent medium to be used in the process of our invention may be any decolorizing clay, such as a fuller's earth, or a high magnesium type of clay, or a magnesium silicate. The high magnesium clays, such as those known under the trade name of "Coenite," or the chemically prepared magnesium silicates, such as "Magnesol," will not be so efficient as the Florida clays, such as those commercially known under the name "Floridin." In general, however, any adsorbent medium of the hydrated silicate type may be used, since such adsorbents have been found to possess a selective adsorbent action towards fatty acids, as compared with rosin acids.

We have further found that the selective action of the adsorbent medium is greater if the adsorbent medium is substantially anhydrous. The term "anhydrous" does not apply to the water that may be bound chemically, or present as water crystallization, but merely to the water, or water and alcohol, that is removable by drying the adsorbent medium to a constant weight at 110° C. An adsorbent medium that has been so dried to constant weight at 110° C. is referred to as anhydrous, or as having 0% of moisture.

The following table shows the effect of the moisture content in the adsorbent medium upon the selective adsorption of the fatty acids, as indicated by the extent of increase in rosin acids, as compared with the starting material, when starting materials of the specified analysis of rosin acids and fatty acids are subjected to treatment by the process of our invention under the specified conditions of earth-to-solids ratio. In this table, where earth is specified, a 16 to 30 mesh "B" Floridin fuller's earth was used. The term "Coenite" applied to a naturally occurring high magnesium type clay occurring naturally in Death Valley, Nevada, and marketed by Coen Company, Inc. The solvent used in all of the determinations shown in the following table was a commercial petroleum hydrocarbon having a boiling range of between 115 and 142° C. and a Kauri Butanol value of 31.6. All filtrations were made of solutions of the starting material in a 15% by weight concentration of solids. The table follows:

*Effect of residual water on selective action of earth on fatty acids in tall oil*

Earth Used: 16-30 Mesh ("B") Floridin
Solvent: Commercial Petroleum Hydrocarbon; Chemical Composition Unknown
Bolling Range 115-142° C. Kauri Butanol Value 31.6 (Benzene=100)
All filtrations in 15% (by wt.) concentration.

| Composition Tall Oil Filter Base, Per Cent | | Earth Ratio | Kind of Earth | Per Cent Moisture In Earth | Composition Tall Oil Product, Per Cent | |
|---|---|---|---|---|---|---|
| R. Acids | F. Acids | | | | R. Acids | F. Acids |
| (1) Crude Tall Oil | | | | | | |
| 46.8 | 39.8 | 2/1 | Floridin B | 0.0 | 54.7 | 34.5 |
| 46.8 | 39.8 | 2/1 | do | 3.0 | 53.5 | 34.6 |
| 46.8 | 39.8 | 2/1 | do | 6.0 | 49.2 | 39.6 |
| (2) Refined Tall Oil | | | | | | |
| 48.0 | 41.0 | 2/1 | do | 0.0 | 54.3 | 34.8 |
| 48.0 | 41.0 | 2/1 | do | 1.5 | 53.8 | 34.6 |
| 48.0 | 41.0 | 2/1 | do | 3.0 | 53.0 | 35.5 |
| 48.0 | 41.0 | 2/1 | do | 4.5 | 51.7 | 37.5 |
| 48.0 | 41.0 | 2/1 | do | 11.0 | 48.2 | 40.8 |
| (3) Refined Tall Oil | | | | | | |
| 69.6 | 23.7 | 2/1 | do | 0.0 | 78.3 | 15.7 |
| 69.6 | 23.7 | 2/1 | do | 4.2 | 74.1 | 19.9 |
| 69.6 | 23.7 | 2/1 | do | 5.0 | 72.7 | 21.9 |
| (4) Refined Tall Oil Distillation Residue | | | | | | |
| 79.5 | 9.3 | 1/1 | do | 0.0 | 83.0 | 6.5 |
| 79.5 | 9.3 | 1/1 | do | 4.2 | 80.3 | 9.1 |
| (4) Refined Tall Oil Distillation Residue | | | | | | |
| 79.5 | 9.3 | 2/1 | do | 0.0 | 87.0 | 2.4 |
| 79.5 | 9.3 | 2/1 | do | 2.0 | 83.8 | 5.3 |
| 79.5 | 9.3 | 2/1 | do | 4.2 | 81.7 | 7.6 |
| 79.5 | 9.3 | 3/1 | do | 0.0 | 88.6 | 0.40 |
| 79.5 | 9.3 | 3/1 | do | 1.5 | 87.4 | 1.8 |
| 79.5 | 9.3 | 3/1 | do | 3.0 | 85.7 | 3.5 |
| (4) Refined Tall Oil Distillation Residue | | | | | | |
| [Using a more selective solvent (2,2,4-Trimethyl Pentane) Kauri 22.4:] | | | | | | |
| 79.5 | 9.3 | 3/1 | Coenite 16-30 Mesh | 0 | 83.0 | 7.5 |
| 79.5 | 9.3 | 3/1 | do | 10.0 | 80.5 | 9.3 |

(2) and (3) Refined tall oil was produced by filtering a crude tall oil through earth in a ratio of .8 earth to 1 of tall oil, the earth containing some residual water, which operation did not change the rosin acids and fatty acids composition but only removed color bodies.
(4) Refined tall oil distillation residue represented a refined tall oil, such as (1), which had been subjected to vacuum distillation in order to separate a fraction high in fatty acids and low in rosin acids, leaving the product (2) as the residue in the still.
(1) This crude tall oil was a different lot than the crude from which refined tall oil (2) was made.

The above table shows the effect of residual water, or moisture content, upon the selective action of the adsorbent medium toward the fatty acids in the starting mixture of fatty acids and rosin acids. In general, the lower the moisture content of the adsorbent medium, the more selective is the action of the adsorbent medium toward the fatty acids, that is, the more strongly are the fatty acids adsorbed by the adsorbent medium as compared with the rosin acids. Accordingly, it is possible by proper control of the moisture content of the adsorbent medium to use earth-to-solids ratios as low as one to one and still obtain a product having an increased rosin acids content as compared with the rosin acids content of the starting material. Proper control both of the moisture content of the adsorbent medium and of the composition of the adsorbent used, and of the earth-to-solids ratio can be employed to give any desired increase in the rosin acids-to-fatty acids ratio, up to and including a rosin substantially free from fatty acids and that is pale and hard at ordinary room temperature.

Since the effect of alcohol upon the adsorbent medium is much the same as that of water, the combined water and alcohol content should be kept as low as possible for best results. The presence of alcohol in the adsorbent medium is, of course, due to the fact that alcohol is the most commonly used solvent for revivifying the adsorbent medium for re-use. By the term "alcohol" is meant any of the alcohols, such as ethyl alcohol, denatured ethyl alcohol, isopropyl alcohol and the like, that are suitable for use in the revivifying of adsorbent mediums of the hydrated silicate type.

The process of our invention may be carried out in various ways, as by contacting a solution of the mixture of rosin and fatty acids in a suitable solvent as described above with a mass of the adsorbent material in the form of a stationary bed and causing the solution to percolate through such bed by gravity or under pressure. The amount of solution to be filtered through a given weight of the adsorbent medium may be determined in advance in accordance with the ratio of adsorbent medium to solids content of the solution, or the filtration can be continued for so long as the filtrate shows the desired increase in the rosin acids-to-fatty acids ratio as compared with the ratio of rosin acids-to-fatty acids in the starting mixture. In the latter case, the filtrate is analyzed from time to time to determine the ratio of rosin acids-to-fatty acids, and filtration is stopped while the filtrate as a whole still shows the desired increase in rosin acids-to-fatty acids ratio as compared with the ratio in the starting material, or the filtration can be stopped at any desired point before the ratio in the filtrate drops to the same ratio as in the starting material. At the end of the filtration step, the solution remaining in the adsorbent medium is then displaced by solvent containing substantially no rosin and fatty acids, and the solution so displaced is either added to the rest of the filtrate or is collected separately. The adsorbent medium may then be revivified in any of the known ways.

Preferably, the adsorbent medium is employed in the form of stationary beds arranged in a series, whereby a cyclic operation can be carried out. This permits any single unit to be operated to its maximum adsorption efficiency before being cut out for revivification. Revivification of the spent adsorbent material, such as fuller's earth, can be accomplished by the method described in our Patent No. 2,280,843, dated April 28, 1942. Where fuller's earth is used as the adsorbent medium, the revivification should remove substantially all of the water and/or revivifying solvent, such as alcohol, as well as all of the adsorbed material. The revivification is best accomplished by the use of ordinary ethyl alcohol, or a mixture of alcohol in petroleum naphtha, the alcohol preferably being sufficiently anhydrous to prevent separation into layers, and in order to facilitate the recovery of an alcohol-naphtha solution for re-use. Also, as already stated, the adsorbent medium should be in a substantially anhydrous state in order to give the most effective fractional separation of rosin acid from fatty acids.

The concentration of rosin acids and fatty acids in the solvents used is largely governed by solvent economy. Concentrations below about 20 to 25% of combined rosin acids and fatty acids content by weight of the solution give the most effective separation.

The following examples will serve to illustrate further embodiments of our invention, using a commercially available petroleum naphtha as the solvent and fuller's earth as the adsorbent medium. Since the petroleum naphtha used had a solvency value of about 31.6 and since the fuller's earth was not always entirely anhydrous, particularly after revivification, we found it necessary in the processes of these examples to use ratios of earth to tall oil solids of at least 3 to 1 in order to obtain the results given, but had a solvent of lower solvency value and an anhydrous adsorbent medium been used, lower ratios of fuller's earth to solids could have been employed to give the same or better results. It will be understood that our invention is not limited to the specific details of these examples. In these examples, parts by weight are expressed, unless otherwise stated.

Example I

A tall oil having a composition of 37.7% rosin acids and 53% fatty acids (as determined by a modified Twitchell method of analysis) was dissolved in petroleum naphtha to give a solution containing 100 grams of tall oil per litre of solution. This solution was then filtered through fuller's earth (dried at 105° C.) in the ratio of 6 parts of earth to one part tall oil solids. The naphtha was evaporated from the effluent solution and the solids recovered as the residue. These solids showed by analysis 60.2% of rosin acids, representing an increase of over 20% in the rosin concentration.

The fuller's earth was revivified for re-use by the methods described in Patent No. 2,280,843 and thereafter the same amount of the same kind of tall oil was percolated through the revivified earth. The rosin acids content of the material recovered from the effluent after such percolation through the revivified earth was 52.5%.

Example II

Crude "press cake" obtained by the crystallization of rosin acids from tall oil, which "press cake" analyzed 80% rosin acids and 16.2% fatty acids, was percolated in the form of a naphtha solution containing 100 grams of the "press cake" per litre of solution through a bed of dried fuller's earth in a ratio of 3 parts of earth to one part of "press cake." On evaporation of the naphtha from the effluent solution, a hard rosin, which contained substantially no fatty acids, was recovered.

Example III

The starting material was a still residue from which fatty acids had been separated by a vacuum distillation. The material, prior to being subjected to vacuum distillation, had been previously refined by percolating a naphtha solution of the tall oil through fuller's earth in a ratio of one to one. The earth-refined tall oil tested 54% rosin acids and 34% fatty acids. After the fractional distillation, the resulting still residue analyzed 78% rosin acids and 10% fatty acids. This still residue was then percolated in naphtha solution containing 100 grams of still residue per litre of solution through a bed of revivified fuller's earth in a ratio of three parts of earth to one part of the still residue. The material recovered from the filtrate was X+ grade rosin, analyzing 87% rosin acids, 0.5% fatty acids. This superrefined rosin had an acid value of 163, a saponification value of 179 and the yield was 72% by weight of the rosin contained in the still residue.

The material recovered from the spent fuller's earth in the foregoing part of this example, using the revivification process described above, analyzed 51.2% rosin acids and 31.2% fatty acids, and was ready for recycling by vacuum distillation to separate the fatty acids and concentrate the rosin acids in the still residue to a point where a practical earth ratio would yield a hard, purified rosin containing substantially no fatty acids.

Example IV

Tall oil, after being hydrogenated to hydrogenate the fatty acids to stearic acid, with or without substantial hydrogenation of the rosin acids, was subjected to the process described in Patent No. 2,317,797 for separating the fatty acids from the tall oil. This process left a rosin residue, which may or may not be hydrogenated, but which is relatively high in resin acids and also contains fatty acids (stearic acid principally).

One part of a rosin residue from the foregoing process of this example, which analyzed 66% rosin acids, 15.5% fatty acids and 18.5% esters and unsaponifiables was percolated in a 10% naphtha solution through a dry decolorizing clay in the ratio of 3.6 parts of clay to 1 part of the rosin residue. The material recovered from the filtrate analyzed 77.6% of rosin acids and 4% of fatty acids. The product was extremely pale in color and was substantially a hard rosin.

Example V

A refined tall oil, in which the rosin acids have been partially polymerized by treatment with sulphuric acid, and which analyzed 47.2% rosin acids and 38.8% fatty acids, was used as a starting material. One part of this tall oil in a petroleum naphtha solution containing 100 grams of tall oil per litre of solution was percolated through six parts of a revivified decolorizing clay. The rosin acids content of the solids in the filtrate had increased to 61.5% and the fatty acids content was reduced to 23.2%.

Example VI

The same partially polymerized tall oil referred to in Example V was subjected to partial vacuum fractional distillation, and a still residue was obtained which tested 66% rosin acids. One part of this still residue in petroleum naphtha solution containing 100 grams of the still residue per litre of solution was percolated through four parts of dried fuller's earth. The material recovered from the filtrate was a hard, pale rosin containing only 0.5% of fatty acids.

*Example VII*

A crude tall oil which had been given a preliminary refinement by heating with 1% of mineral acid at 190 to 200° C., and then flash distilled to separate color bodies and heat unstable constituents, analyzed 39.2% rosin acids, and 55.4% fatty acids. This material was then subjected to partial fractional distillation at one to two millimeters of mercury absolute pressure and the rosin acids concentrated in a 50% still residue testing in excess of 70% rosin acids. The still residue was filtered in naphtha solution through dried fuller's earth in the ratio of four and one-half parts of fuller's earth to one part of still residue, and the filtrate so obtained was then evaporated to yield a hard, pale rosin containing only 2.7% of fatty acids.

*Example VIII*

When starting with crude tall oil, the first step of our process is preferably a refining step, using an adsorbent decolorizing medium to remove color bodies and oxygenated compounds, and also to partially desulfurize the tall oil. The crude tall oil is dissolved in a liquid hydrocarbon solvent, such as a petroleum naphtha, or other petroleum solvent, to form a solution containing preferably less than 25% of tall oil solids by weight of the solution. A concentration of between 10 and 25% by weight is entirely satisfactory. The solution so formed is then percolated through an adsorbent decolorizing medium, such as fuller's earth or other decolorizing clay, a high magnesia type of clay, a synthetic magnesium silicate, or other medium of the hydrated silicate type. In the percolation step, the ratio of adsorbent medium to tall oil solids is preferably rather low, such for instance as from ½ to 1 part of adsorbent medium to 1 part of tall oil solids by weight.

This adsorption treatment serves to concentrate upon the adsorbent medium the sterols present in the tall oil, as described in our Patent No. 2,280,843. The sterols can, if desired, be recovered from the spent adsorbent medium by the process disclosed in that patent. The percolation of the solution of crude tall oil through the adsorbent medium also serves to partially desulfurize the oil. The complete desulfurization of the tall oil can then be accomplished by treatment of the decolorized and partially desulfurized tall oil at a temperature above about 150° C. with a compound of a heavy metal, in accordance with the process disclosed in our Patent No. 2,317,797. The complete desulfurization step can also be conveniently carried out at a later stage of the present process, as will subsequently be described.

In the next step, the decolorized and refined tall oil is subjected to fractional distillation under a relatively high vacuum, using an efficient fractionating column. When fractionating at about 1 millimeter of mercury, absolute pressure, the temperature of the vapor at the start is about 180° C. When 190° C. is reached, as measured at the top of the column, about 5% of the oil will have distilled over. This 5% fraction contains an excess of hydrocarbons and may be collected separately.

During the continued fractional distillation there is obtained a second fraction, also at about 1 millimeter of mercury, absolute pressure, and with the vapor temperature at the top of the column between about 190 and 193° C. This second fraction is nearly pure fatty acids, having an acid value in excess of 194 and containing from about 1 to 10% of rosin acids, depending upon the severity of the fractionation and where the cut is made. The volume of this fraction depends largely on the fatty acids content of the starting material. The distillation is preferably stopped when the rosin acids content of the still residue exceeds 75% by weight of the original charge placed in the still.

In the next step, the still residue from the fractional distillation operation, which may, for instance, analyze from 70 to 80% rosin acids and about 20 to 10% fatty acids, is dissolved in a petroleum solvent, such as petroleum naphtha, and fractionated by selective adsorption in the manner described, viz., by percolation of the solution through a stationary bed of a hydrated silicate type of adsorbent medium, such as fuller's earth. In the case of ordinary petroleum naphtha as the solvent, the amount of fuller's earth used should be in the proportion of between 3 and 6 parts of adsorbent medium to 1 part of still residue solids, by weight. The fatty acids present in the solution of the still residue are selectively adsorbed by the adsorbent medium, while the rosin acids leave the bed of the adsorbent medium in the effluent. A very high grade rosin, such, for instance, as an X+ grade rosin analyzing 87% rosin acids and 0.5% fatty acids, can be obtained from the effluent by evaporation of the solvent.

The adsorbent medium spent in the foregoing step and containing adsorbed fatty acids and rosin acids is then subjected to a revivification step. The revivification is best effected by passing through the spent adsorbent medium a revivifying solvent, such as alcohol or a mixture of alcohol and petroleum naphtha, until the adsorbent medium is substantially free of adsorbed fatty acids and rosin acids and then displacing the revivifying solvent by straight naphtha.

The material released from the adsorbent medium by the revivification step will consist of a mixture of fatty acids and rosin acids, the proportions varying with the ratio of earth to tall oil employed and the efficiency of the operation. A typical analysis of the recovered material will run about 50% rosin acids and 30% fatty acids. Considering that the still residue put through the adsorbent medium analyzed from 70 to 80% rosin acids and only about 20% to 10% fatty acids, this analysis of the recovered material indicates the selective adsorption action of the adsorbent medium toward the fatty acids. Such selective adsorption action is further established by the fact that the effluent leaving the adsorbent medium contains substantially no fatty acids.

The material recovered in the revivification step may be recycled either with the next batch of crude tall oil, thus giving it an additional prerefinement, or it may be run directly into a fractionating still, either alone or admixed with other refined tall oil, in order to concentrate the rosin acids present and recover a distillate fraction of nearly pure fatty acids.

Complete desulfurization of the still residue referred to above may be accomplished in any of a number of ways. The sulfur compounds in tall oil apparently do not distill readily when in a combined state, since the distillate of fatty acids obtained in the second step above described is usually free of sulfur, while the still residue may contain combined sulfur. Several efficient desulfurization processes are disclosed in our Patent No. 2,317,797. The still residue, which is left in the still at the end of the second step and which is high in rosin concentration, is a convenient material to desulfurize by treatment with a compound of a heavy metal at a temperature above about 150° C. The still residue is at a favorable temperature, over 225° C., at the end of the distillation step for treatment with litharge, which can be added in small amounts of the order of from ½ to 1% depending upon the amount of sulfur present. The still residue to which the litharge has been added is then dissolved in petroleum naphtha to a concentration of about 50% by weight and a small amount of oxalic acid is added to convert any lead compounds of rosin and/or fatty acids into the insoluble oxalates. The insoluble oxalates and sulfides of lead can then be separated, preferably by filtration.

Desulfurization may precede or follow any refining step. Numerous variations of the general process above described are possible, but all such variations include the selective adsorption step above described.

For example, the first step of refining the crude oil may include a concentration of the rosin acids by crystallization from the crude tall oil to give the so-called "press cake" of commerce, which may then be given a pre-refinement by means of a decolorizing adsorbent medium prior to the selective adsorption step.

Alternatively, the crude tall oil may be subjected to the action of a decolorizing adsorbent medium or to a selective solvent treatment, using a selective solvent such as furfural, to produce a refined tall oil, as above described, and the refined tall oil may then be subjected to a crystallization step to concentrate the rosin acids. By this variation in the process a substantial portion of the rosin acids is not subjected to the possible danger of excessive temperature in case difficulties are encountered in the fractional distillation step, due to failure to control the degree of vacuum, or the like. The first step in our process may also be a combination of refining and polymerization, using any of the well known polymerization catalysts, such as sulfuric acid, zinc chloride, boron trifluoride and others. In that case, the still residue and rosin recovered from the selective adsorption step will be partially polymerized rosin.

The first step of our process may also be a catalytic distillation step performed either on crude or pre-refined tall oil. For example, it may involve a distillation under high vacuum of a crude tall oil previously treated with a mineral acid to fix the impurities in the crude tall oil and prevent them from distilling. Tall oils of this type sometimes show an abnormal content of unstable ester or lactone in the rosin concentrate obtained in the second step of our process. Such ester or lactone is readily hydrolized with steam at a high temperature, by using temperatures below those effecting decarboxylation, say around 240° C.

When the objective is to obtain rosin as one product of the process, it is desirable to prepare a rosin concentrate for the selective adsorption step. Any method may be used that concentrates the rosin acids normally present in tall oil so as to give a mixture of rosin acids and fatty acids containing 70% or over of rosin acids by weight of the mixture.

The fatty acids obtained by our process may be subjected to refractionation, if necessary or desired, to obtain a desired degree of purity not obtained in the first fractionation.

If the rosin acids obtained from the selective adsorption step have not been previously treated to change their physical properties, that is, the naturally occurring rosin acids in the crude tall oil have simply been purified and separated, the recovered rosin consisting of such rosin acids may then be polymerized, or hydrogenated, or disproportionated, by heat or by the use of chemicals, or subjected to any other treatment used to improve or change the properties of wood or gum rosin. Either before or after these treatments, the rosin may be converted into useful compounds or derivatives, such as are now produced from wood or gum rosin, including esters, ethers, soaps, metal resinates, maleic anhydride addition products, and the like.

It will thus be appreciated that our process provides a relatively simple and economical way of effecting an increase in the rosin acids-to-fatty acids content of a starting mixture of the two acids, to obtain a product having a substantially increased ratio of rosin acids-to-fatty acids, or even a product that consists substantially entirely of rosin acids, or rosin, in substantially pure state and available for use in any of the commercial processes requiring these pure materials.

In the claims, the term "fatty acids" is intended to include any compound that is derived from and includes the fatty acids in the original starting mixture of fatty acids and rosin acids. For instance, if tall oil is first hydrogenated, polymerized or esterified, the fatty acids present may be converted into saturated fatty acids, fatty acid polymers or fatty acid esters, respectively, but all of these fatty acid conversion products are intended to be included within the expression "fatty acids." The term "rosin acids" is to be similarly understood as including rosin acids themselves and their conversion products.

Reference is hereby made to the Robert C. Palmer copending application Serial No. 553,123, filed September 7, 1944, wherein is disclosed and claimed a similar process as applied to a starting material comprising a mixture of rosin acids and partially esterified fatty acids.

We claim as our invention:

1. The process of separating rosin from tall oil, which comprises percolating a solution of such mixture in an aliphatic hydrocarbon solvent having a Kauri Butanol value lower than 31.6 through an adsorbent medium of the hydrated silicate type in the ratio of at least 2 parts of medium to 1 part of tall oil by weight, discontinuing such percolation while the effluent contains a higher proportion of rosin acids to fatty acids than that in said tall oil and recovering rosin from the resulting effluent.

2. The process of recovering rosin from a mixture of rosin and higher fatty acids, having a rosin-to-fatty acid ratio greater than 1 to 1, which comprises filtering a solution of said mixture in a liquid aliphatic hydrocarbon having a Kauri Butanol value lower than 31.6 through a body of an adsorbent medium of the hydrated silicate type in the ratio of at least 2 parts of medium to 1 part of mixture by weight discontinuing such filtration while the filtrate as a whole contains a higher proportion of rosin acids to fatty acids than existed in the starting material, and recovering from said filtrate a rosin relatively high in rosin acids and low in fatty acids.

3. The process of recovering rosin from a mixture of rosin and higher fatty acids, having a rosin-to-fatty acid ratio greater than 1 to 1, which comprises filtering a solution of said mixture in petroleum naphtha through a body of substantially anhydrous fuller's earth in the ratio of at least 2 parts of earth to 1 part of mixture by weight discontinuing such filtration while the filtrate as a whole contains a higher proportion of rosin acids to fatty acids than existed in the starting material, and recovering from said filtrate a rosin relatively high in rosin acids and low in fatty acids.

4. The process of recovering rosin from a pre-refined tall oil, which comprises dissolving said tall oil in a liquid aliphatic hydrocarbon solvent having a Kauri Butanol value lower than 31.6, filtering the resulting solution through an adsorbent medium of the hydrated silicate type in the ratio of at least 2 parts of medium to 1 part of tall oil by weight discontinuing such filtration while the filtrate as a whole contains a higher proportion of rosin acids to fatty acids than existed in the starting material, and recovering from the resulting filtrate a hard, pale rosin high in rosin acids and low in fatty acids.

5. The process of recovering rosin from a pre-refined tall oil, which comprises dissolving said tall oil in a petroleum naphtha filtering the resulting solution through substantially anhydrous fuller's earth in the ratio of at least 2 parts of fuller's earth to 1 part of tall oil by weight discontinuing such filtration while the filtrate as a whole contains a higher proportion of rosin acids to fatty acids than existed in the starting material, and recovering from said filtrate a hard, pale rosin high in rosin acids and low in fatty acids.

6. The process of recovering rosin from a pre-refined tall oil substantially free from color bodies and having a high rosin acid content as compared with its fatty acids content, which comprises dissolving said pre-refined tall oil in a petroleum solvent, filtering the resulting solution through an adsorbent medium of the hydrated silicate type in the ratio of between 3 and 6 parts of said medium to 1 part of said tall oil by weight and recovering from the resulting filtrate a hard, pale rosin.

7. The process of recovering rosin from a hydrogenated tall oil substantially free from color bodies and having a high rosin acid content as compared with its fatty acids content, which comprises dissolving said pre-refined tall oil in a petroleum solvent, filtering the resulting solution through an adsorbent medium of the hydrated silicate type in the ratio of at between 3 and 6 parts of said medium to 1 part of said tall oil by weight, and recovering from the resulting filtrate a hard, pale rosin containing only a small percentage of hydrogenated fatty acids.

8. The process of recovering fatty acids and rosin from a refined tall oil, which comprises subjecting said tall oil to vacuum fractional distillation to obtain a distillate fraction containing substantially pure fatty acids and a still residue containing rosin and fatty acids, dissolving said still residue in petroleum naphtha, filtering the resulting naphtha solution through a sufficient quantity of fuller's earth in the ratio of at least 3 parts of fuller's earth to 1 part of said still residue by weight to selectively adsorb fatty acids contained in said solution, and recovering from the effluent from said filtering step a rosin substantially free from fatty acids.

9. The process of recovering fatty acids and rosin from a mixture of higher fatty acids and rosin acids, which comprises fractionally distilling said mixture under vacuum to recover higher fatty acids in the distillate therefrom and a still residue containing rosin and higher fatty acids, dissolving said still residue in a liquid aliphatic hydrocarbon, percolating the resulting solution of said still residue through a hydrated silicate type of adsorbent medium in the proportion of at least three parts of adsorbent medium to one part of still residue by weight, and separating from said medium the resulting solution containing rosin substantially free of fatty acids.

10. The process of recovering fatty acids and rosin from a mixture of higher fatty acids and rosin acids, which comprises fractionally distilling said mixture under vacuum to recover higher fatty acids in the distillate therefrom and a still residue containing rosin and higher fatty acids, dissolving said still residue in a liquid aliphatic hydrocarbon, percolating the resulting solution of said still residue through a hydrated silicate type of adsorbent medium in the proportion of at least three parts of adsorbent medium to one part of still residue by weight, separating from said medium the resulting solution containing rosin substantially free of fatty acids and isolating said rosin from said resulting solution.

11. The process of recovering fatty acids and rosin from a refined tall oil, which comprises fractionally distilling said refined tall oil under vacuum to recover higher fatty acids in the distillate therefrom and a still residue containing rosin and higher fatty acids, dissolving said still residue in a liquid aliphatic hydrocarbon, percolating the resulting solution of said still residue through a hydrated silicate type of adsorbent medium in the proportion of at least three parts of adsorbent medium to one part of still residue by weight, and separating from said medium the resulting solution containing rosin substantially free of fatty acids.

12. The process of recovering fatty acids and rosin from a refined tall oil, which comprises subjecting said refined tall oil to vacuum fractional distillation to obtain a distillate fraction containing substantially pure fatty acids and a still residue containing rosin and fatty acids, dissolving said still residue in a liquid aliphatic hydrocarbon, filtering the resulting solution through a hydrated silicate type of adsorbent medium in the ratio of at least three parts of adsorbent medium to one part of still residue by weight to obtain an effluent containing rosin substantially free from fatty acids, displacing adsorbed fatty and rosin acids from said medium and recycling such fatty and rosin acids through the preceding steps of vacuum fractional distillation and filtering through said adsorbent medium.

13. In a process of treating a starting material selected from the group consisting of a mixture of rosin and higher fatty acids and a mixture of rosin and higher fatty acids that has been hydrogenated, polymerized or esterified, the process including dissolving said starting material in a liquid aliphatic hydrocarbon solvent and filtering the resulting solution through a bed of an adsorbent of the hydrated silicate type, the improvement whereby a product of enhanced rosin acids content is recovered which comprises carrying out said process under at least one of the following conditions: first, employing an adsorbent that is substantially anhydrous; secondly, employing a solvent that has a Kauri butanol value lower than 31.6; and, thirdly, employing a weight ratio of adsorbent to starting material that is greater than 2 to 1; and under any of the conditions so selected stopping the filtration while the filtrate as a whole contains a higher proportion of rosin acids to fatty acids than existed in said starting material, and recovering said filtrate.

14. In a process of treating a starting material selected from the group consisting of a mixture of rosin and higher fatty acids and a mixture of rosin and higher fatty acids that has been hydrogenated, polymerized or esterified, the process including dissolving said starting material in a liquid aliphatic hydrocarbon solvent and filtering the resulting solution through a bed of fuller's earth, the improvement whereby a product of enhanced rosin acids content is recovered which comprises carrying out said process under at least one of the following conditions: first, employing an adsorbent that is substantially anhydrous; secondly, employing a solvent that has a Kauri butanol value lower than 31.6; and, thirdly, employing a weight ratio of adsorbent to starting material that is greater than 2 to 1; and under any of the conditions so selected stopping the filtration while the filtrate as a whole contains a higher proportion of rosin acids to fatty acids than existed in said starting material, and recovering said filtrate.

15. In a process of treating a starting material selected from the group consisting of a mixture of rosin and higher fatty acids and a mixture of rosin and higher fatty acids that has been hydrogenated, polymerized or esterified, the process including dissolving said starting material in a liquid aliphatic hydrocarbon solvent and filtering the resulting solution through a bed of an adsorbent of the hydrated silicate type, the improvement whereby a product of enhanced rosin acids content is recovered which comprises carrying out said process under at least one of the following conditions: first, employing an adsorbent that is substantially anhydrous; secondly, employing a solvent that has a Kauri butanol value lower than 31.6; and, thirdly, employing a weight ratio of adsorbent to starting material that is greater than 2 to 1; and under any of the conditions so selected stopping the filtration while the filtrate from said bed contains substantially only rosin acids, displacing any solution remaining in said bed by means of a liquid aliphatic hydrocarbon to effect filtration of said remaining solution and recovering and combining the resulting filtrates to obtain a solution containing rosin acids in a higher proportion to fatty acids than in said starting material.

16. In a process of treating tall oil including subjecting said tall oil to vacuum fractional distillation to obtain a distillate fraction containing substantially pure fatty acids and a still residue containing a mixture of rosin and fatty acids, dissolving said still residue in a liquid aliphatic hydrocarbon and filtering the resulting solution through an adsorbent medium of the hydrated silicate type, the improvement whereby a product of enhanced rosin acids content is recovered which comprises carrying out said process under at least one of the following conditions: first, employing an adsorbent that is substantially anhydrous; secondly, employing a solvent that has a Kauri butanol value lower than 31.6; and, thirdly, employing a weight ratio of adsorbent to still residue that is greater than 2 to 1; and under any of the conditions so selected stopping the filtration while the filtrate as a whole contains a higher proportion of rosin acids to fatty acids than existed in said still residue.

17. The process of recovering higher fatty acids and rosin from tall oil, which comprises refining said tall oil to remove color bodies and oxygenated compounds, subjecting said refined tall oil to fractional distillation under high vacuum to recover a distillate fraction containing substantially pure fatty acids and to obtain a still residue containing rosin and fatty acids, dissolving said still residue in a liquid aliphatic hydrocarbon solvent and filtering the resulting still residue solution through an adsorbent medium to effect selective adsorption of said fatty acids, the filtration being carried out under at least one of the following conditions: first, employing an adsorbent that is substantially anhydrous; secondly, employing a solvent that has a Kauri butanol value lower than 31.6; and, thirdly, employing a weight ratio of adsorbent to still residue that is greater than 2 to 1; and under any of the conditions so selected stopping the filtration while the filtrate as a whole contains substantially rosin acids only and recovering a high grade rosin from said filtrate.

ROBERT C. PALMER.
ANTHONY F. OLIVER.

REFERENCES CITED

The following references are of record in the file of this patent:

UNITED STATES PATENTS

| Number | Name | Date |
| --- | --- | --- |
| 2,280,842 | Oliver et al. | Apr. 28, 1942 |